US008677681B2

(12) United States Patent
Purnell et al.

(10) Patent No.: US 8,677,681 B2
(45) Date of Patent: Mar. 25, 2014

(54) METHODS FOR MODULATING STROBILI DEVELOPMENT IN GYMNOSPERM TREES

(75) Inventors: Robert C. Purnell, Hot Springs, AR (US); Daniel F. Morrow, Pearcy, AR (US); Leon C. Burris, Donaldson, AR (US)

(73) Assignee: Weyerhaeuser NR Company, Federal Way, WA (US)

( * ) Notice: Subject to any disclaimer, the term of this patent is extended or adjusted under 35 U.S.C. 154(b) by 222 days.

(21) Appl. No.: 13/173,229

(22) Filed: Jun. 30, 2011

(65) Prior Publication Data

US 2013/0000186 A1  Jan. 3, 2013

(51) Int. Cl.
*A01G 13/02* (2006.01)

(52) U.S. Cl.
USPC .............................. 47/32.3; 47/20.1

(58) Field of Classification Search
USPC ............. 47/20.1, 31, 32, 32.3, 58.1; 800/260, 800/298, 319
See application file for complete search history.

(56) References Cited

U.S. PATENT DOCUMENTS

| | | | | |
|---|---|---|---|---|
| 4,006,561 A | * | 2/1977 | Thoma et al. | 47/84 |
| 4,199,897 A | | 4/1980 | Greenwood | |
| 4,417,417 A | * | 11/1983 | Mehra-Palta | 435/422 |
| 4,646,467 A | * | 3/1987 | Morrisroe | 47/20.1 |
| 5,235,782 A | * | 8/1993 | Landau | 47/72 |
| 5,304,725 A | * | 4/1994 | Nelson | 800/268 |
| 5,406,746 A | * | 4/1995 | Hoshino | 47/24.1 |
| 2007/0227925 A1 | * | 10/2007 | Westrate | 206/423 |

OTHER PUBLICATIONS

Greenwood, Michael S., Flower Stimulation Techniques for Toblolly Pine (Pinus Taeda L), Forestry Research Technical Report, Hot Springs Forestry Research Center, Hot Springs, AR, US, Jun. 1977.
Bramlett, D.L., et al., Surrogate pollen induction shortens the breeding cycle in loblolly pine, Tree Physiology 15, 531-535, 1995 Heron Publishing, Victoria, CA.

* cited by examiner

*Primary Examiner* — Rob Swiatek
*Assistant Examiner* — Ebony Evans
(74) *Attorney, Agent, or Firm* — BakerHostetler

(57) ABSTRACT

A method of modulating the development stage of strobili growing on a gymnosperm tree comprises: (a) installing a protective covering over one or more strobili bud(s), wherein the type of protective covering is selected to delay or advance strobili development; and (b) maintaining the protective covering over the strobili bud(s) for a time period sufficient to delay or advance the development stage of the covered strobili buds in comparison to the development stage of naturally growing, uncovered, control strobili.

20 Claims, 8 Drawing Sheets

METHODS FOR MODULATING STROBILI DEVELOPMENT IN GYMNOSPERM TREES

FIELD OF INVENTION

The present invention relates to methods for modulating strobili development in gymnosperm trees.

BACKGROUND

Controlled pollination of forest trees, such as conifers, is used to produce families of known parentage for progeny testing and advanced-generation breeding. Breeding conifer trees (e.g. loblolly pine trees) quickly after selection has been a challenge since the inception of tree improvement programs in the 1950's (see e.g., Zobel and Talbert, Applied Forest Tree Improvement, Wiley, New York, 505 pp. (1984). Grafts made on one-year-old rootstock in the field do not produce enough strobili (flowers) for breeding for 5 or more years. In the 1970's, techniques for greenhouse breeding were developed that shortened the time to producing strobili through the use of various induction techniques such as hormones, root pruning, water stress, girdling and out-of-phase dormancy (Greenwood, M. S., "Flower Stimulation Techniques for Loblolly Pine (*Pinustaeda* L.)," in Proceedings, 3rd World Consultation on Forest Tree Breeding: CSIRO:1031-1042 (1977), Greenwood, M. S, Science 210:443-444 (1978)). While effective at reducing breeding time, greenhouse breeding is expensive and has been replaced by top-grafting in loblolly pine (Bramlett and Burris, "Topworking Young Scions Into Reproductively Mature Loblolly Pine," Proceedings: 23rd Southern Forest Tree Improvement Conference, Asheville, N.C.; pp. 234-241 (1995); Bramlett, D. L., *Journal of Forestry* 95(3):15-19 (1997)). By grafting in the tops of mature orchard trees, strobili can be accelerated and breeding can be completed for a given group of select trees only 2 years after grafting.

While top-graft breeding is faster and less expensive than greenhouse breeding, completion of breeding within 2 years is still a challenge because it is difficult to obtain pollen from enough males in time to pollinate all of the females before they develop past receptivity. Therefore, a need exists for effective methods to modulate strobili development in conifer trees to allow for the breeding of advanced generation selections within a shorter time period, such as within one year.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with the foregoing, in one aspect the invention provides a method of modulating the development stage of strobili growing on a gymnosperm tree, the method comprising: (a) installing a protective covering over one or more strobili bud(s), wherein the type of protective covering is selected to delay or advance strobili development; and (b) maintaining the protective covering over the strobili bud(s) for a time period sufficient to delay or advance the development stage of the covered strobili buds in comparison to the development stage of naturally growing, uncovered, control strobili. In some embodiments, the protective covering is selected to delay the development stage of the covered strobili buds, and comprises a material that completely blocks solar radiation. In some embodiments, the protective covering is installed over a female strobili bud for a time sufficient to delay the development stage of the covered strobili. In some embodiments, the protective covering is selected to advance the development stage of the covered strobili, and comprises a material that maintains a higher temperature inside the protective covering than the outside ambient temperature. In some embodiments, the tree is a conifer tree.

In another aspect, the invention provides a method of synchronizing the timing of pollen collection from male strobili and female strobili receptivity in a gymnosperm tree breeding program. The method according to this aspect of the invention comprises at least one of: (a) advancing the development stage of one or more male strobili on one or more tree(s) by installing over one or more male strobili bud(s) a type of protective covering selected to advance male strobili development, and maintaining the protective covering over the strobili until pollen is generated; and/or (b) delaying the development stage of one or more female strobili on one or more tree(s) in the breeding program, by installing over one or more female strobili bud(s) a type of protective covering selected to delay female strobili development, and maintaining the protective covering over the female strobili until either sufficient pollen is generated in accordance with step (a), or until the majority of uncovered control female strobili are at a developmental stage that is no longer receptive to pollination. In some embodiments, the method further comprises the step of at least one of (i) applying the pollen generated according to step (a) to the female strobili, generated according to step (b), or (ii) applying pollen generated from non-advanced male strobili to the female strobili generated according to step (b). In some embodiments, the gymnosperm tree is a conifer tree.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Unless specifically defined herein, all terms used herein have the same meaning as they would to one skilled in the art of the present invention.

The following definitions are provided in order to provide clarity with respect to the terms as they are used in the specification and claims to describe the present invention.

As used herein, the term "Male Flower" in the context of a conifer tree (e.g., pine or Douglas-fir) refers to microsporangiate strobili.

As used herein, the term "Female Flower" in the context of a conifer tree (e.g., pine or Douglas-fir) refers to megasporangiate strobili.

As used herein, the term "breeding group" refers to a plurality of plants that have been selected based upon at least one desired phenotypic trait. Typically this group will be interbred and the resultant progeny tested and used for making selections for future generations of breeding and testing.

In a gymnosperm breeding program, such as a conifer advanced-generation breeding program, controlled pollination of forest trees is used to produce families of known parentage. Briefly described, this process, outlined below in TABLE 2, involves the selection of trees based on desired criteria, such as a high phenotypic score for one or more desired traits. Scions of the selected trees are then grafted into clone banks and production orchards (i.e. sexually mature trees for breeding purposes). The grafted ramlets begin strobili production after several years. Strobilus primordia, which are enclosed by protective bud scales, develop slowly during the winter months. As strobili develop, they emerge from the bud scales to a receptive stage where they can trap windborne pollen. The stages of strobili development are described in detail in TABLE 1 and illustrated in FIGS. 1A-G.

The grafted trees produce separate megasporangiate strobili (female) and microsporangiate stobili (male) having the genetic characteristics of the original selected trees. Male strobili are collected at about the time pollen sheds from the graft trees. The strobili are processed by drying to less than 10% moisture content, and pollen is then shaken from the strobili and stored, and optionally frozen for future use.

The megasporangiate strobili on the grafts are bagged in isolation bags to prevent contamination from pollen from a different source. Pollen is then applied to the megaspoangiate strobili on the grafted material at a time when the bract scales are at a receptive stage. The pollinated strobili mature into cones and are collected in the fall, approximately 18 months after pollination for loblolly pine. Seeds are extracted from the cones.

TABLE 1

Developmental Stages of Strobili Development (based on Cumming and Righter 1948), as described in the "Pollen Management Handbook," Agriculture Handbook Number 587, page 44-51 (1981)

Figure 1A:
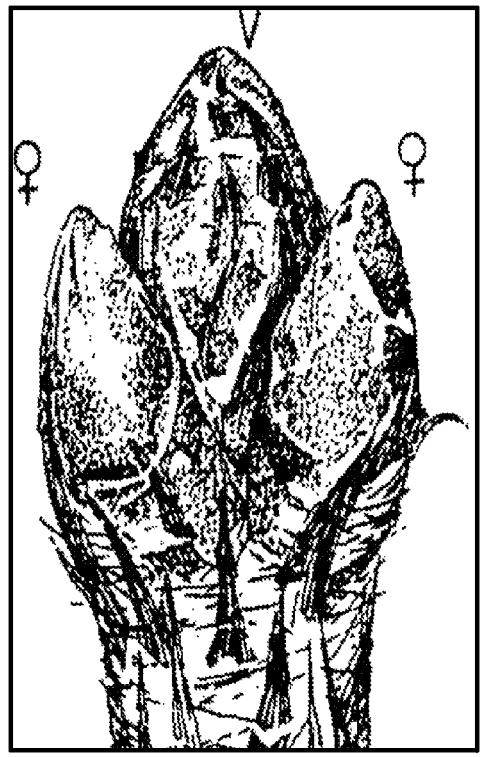
FIGS. 1A-G illustrate the different stages of strobili development, as described in TABLE 1.
Figure 1B:
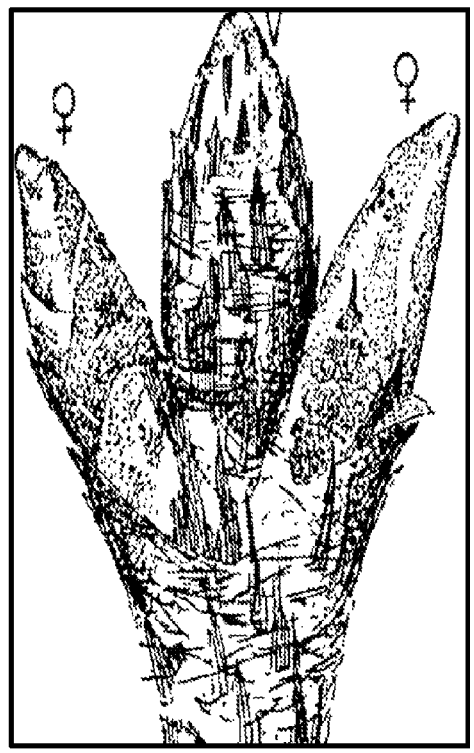
Figure 1C:
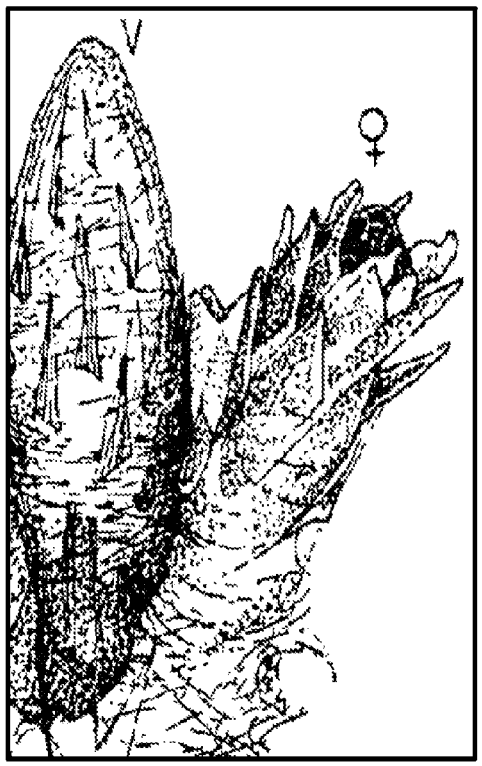
Figure 1D:
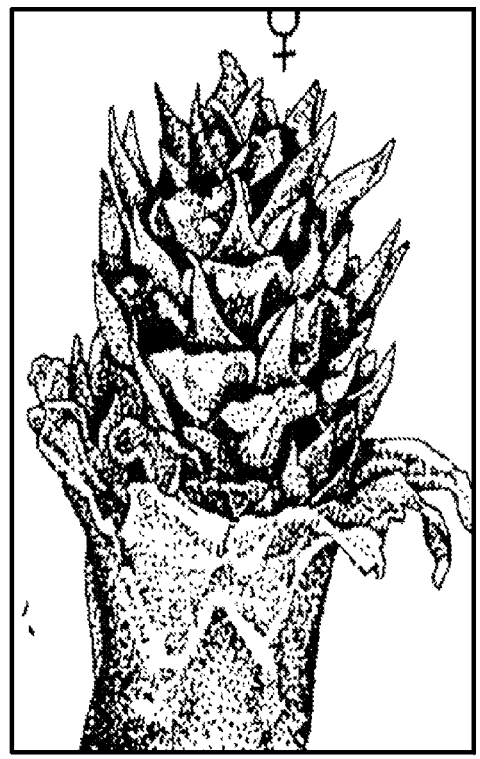
Figure 1E:
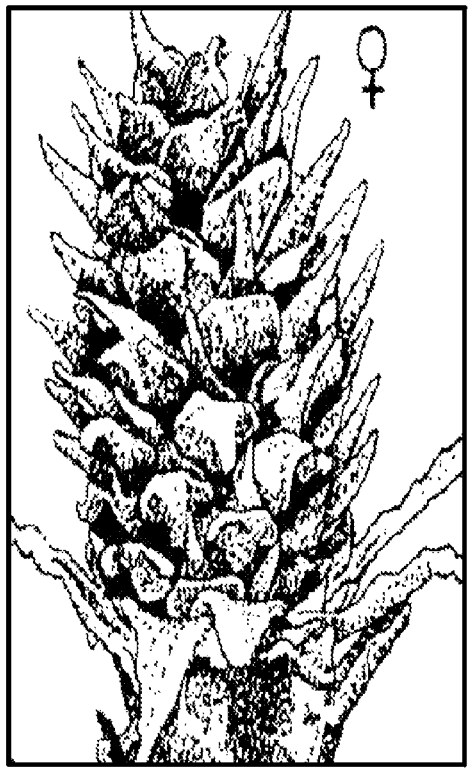

| Developmental Stage | Description | Tree breeding Significance | FIG. 1 cross-reference |
|---|---|---|---|
| 1 | Small flower buds are covered by tight bud scales | Identify potential branches to pollinate | FIG. 1A (stage 1: small flower buds) |
| 2 | Large flower buds; flower is still covered by bud scales. Top of female bud is light colored. Conelet primordia are enclosed within the scales. | Place pollination bags (isolation bags) on branches (to prevent contamination by outside pollen sources) | FIG. 1B (stage 2: large flower buds) |
| 3 | Flower is emerging from bud scales; rudimentary cone scales are observable. conelets begin to emerge through the tip of the scales. | to avoid seed formation from unknown parentage, bag conelets before stage 3 begins. | FIG. 1C (stage 3: flower begins to emerge through the tip of the bud scales) |
| 4 | Flower (conelet) elongates and extends beyond the bud scales; cone scales are small | too late to install bags; too early to apply pollen, but conelets that receive pollen will produce some seeds | FIG. 1D (stage 4: flower extends beyond the bud scales; FIG. 1E (late stage 4: flower is most of the way out of the bud scales but is not yet fully receptive) |
| 5 | Maximum flower receptivity; the conelet has completely emerged from the bud scales; large opening between the cone scales; cone scales form right angles with cone axis | pollinate flowers until stage 6 is reached; this stage may last from 1 day to 1 week depending on weather and temperature | FIG. 1F (stage 5: flower is fully extended from bud scales and scales are at stage 5) FIG. 1G (late stage 5: the opening between scales and the bracts is closing) |
| 6 | Spaces between cone scales are closed by the enlargement and growth of the scales | too late to pollinate; remove pollination bags | FIG. 1H (stage 6: the opening between the scales is closed by the scale enlargement) |

As described in Examples 1-5 herein, the inventors have discovered a method of modulating the development stage of strobili (flowers) growing on a conifer tree by installing a protective covering, such as a bag, over a strobili bud at an early stage of development, where the type of protective covering is selected to either delay (i.e., retard) strobili development or advance strobili development. For example, a type of protective covering selected to delay strobili development may be installed over a megasporangiate strobili (female flower) bud to delay the development of the megasporangiate strobili until such time as pollen is in hand. In another example, a type of protective covering selected to advance strobili development may be installed over a strobili bud to advance the flower to a desired stage (e.g., a female to receptive stage, or a male to pollen production).

In accordance with the foregoing, in one aspect the invention provides a method of modulating the development stage of strobili growing on a gymnosperm tree, the method comprising: (a) installing a protective covering over one more strobili bud(s), wherein the type of protective covering is selected to delay or advance strobili development; and (b) maintaining the protective covering over the strobili bud(s) for a time period sufficient to delay or advance the development stage of the covered strobili buds in comparison to the development stage of naturally growing, uncovered, control strobilis.

The protective covering for use in the invention may be constructed from any suitable material that can be installed to cover and surround one or more strobili buds on a living tree branch. In some embodiments, the protective covering is in the form of a bag or sleeve formed of a rigid or non-rigid material. In some embodiments, the protective covering is in the form of material (e.g., aluminum foil) that is wrapped over a branch comprising one or more strobili buds and fastened in place. In some embodiments, the protective covering comprises or consists of a material that completely blocks solar radiation and maintains air temperature inside the covering close to (i.e. within 5 to 10 degrees F.) the ambient temperature outside the protective covering.

In some embodiments, the protective covering comprises an inner layer and an outer layer that may be removable. In some embodiments, the protective covering is fastened around the branch with a suitable fastener, such as a plastic tie, string, wire, etc. such that solar radiation is excluded from inside the protective covering.

Figure 2:
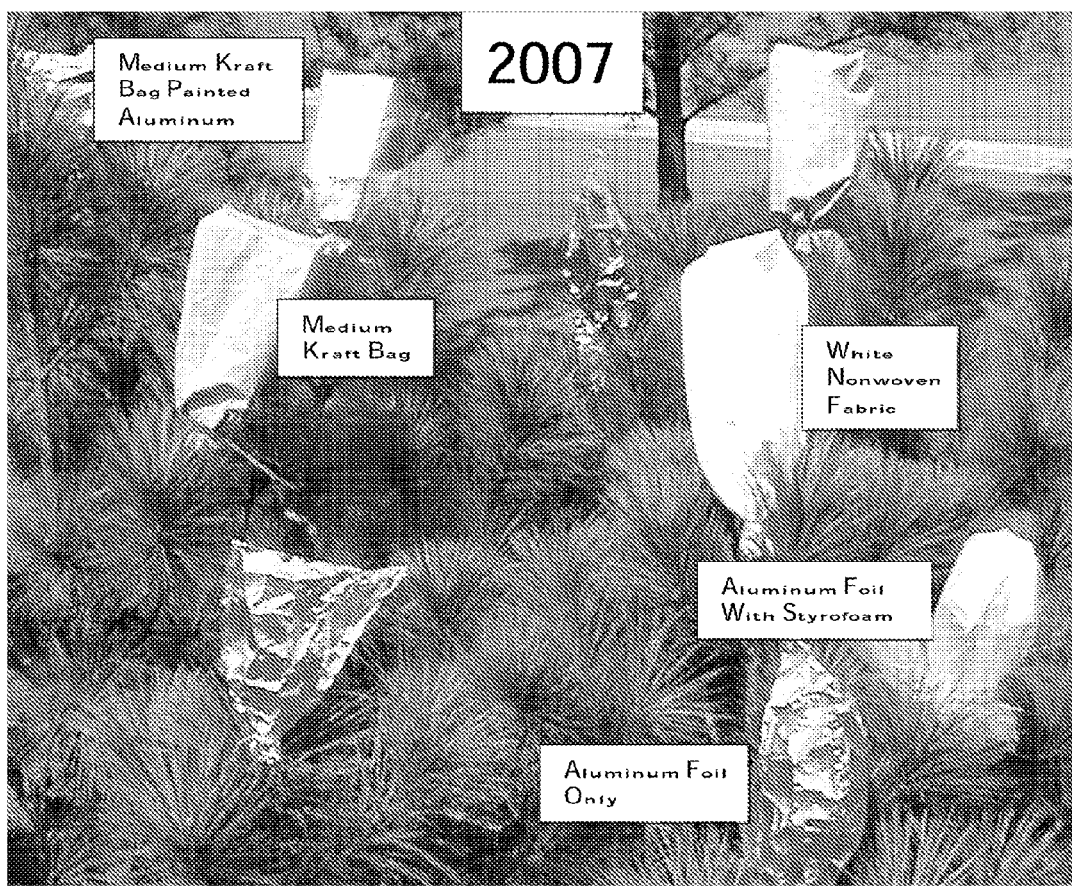
FIG. 2 is a photograph of a representative field test showing various types of protective coverings (isolation bags) covering loblolly pine conelets, as described in Examples 1 and 2.

The installation of a protective covering is carried out by choosing a location where the protective covering, such as a bag, will be attached to the branch, such as a natural node on the branch. In embodiments using conifer trees, the needles may optionally be trimmed. The protective covering is then placed over the shoots and strobili buds and gathered at the bottom with wire or other suitable binding material (rope, clamp, plastic tie, etc.) in order to exclude sunlight for delaying strobili development; or to retain heat for advancing strobili development. Representative protective coverings in the form of bags are shown in FIG. 2.

In accordance with the method of the invention, in one embodiment, the protective covering is selected to delay strobili (flower) development. As described in Examples 1-5 herein, the inventors have determined that a protective covering comprising a material that completely blocks solar radiation are effective to delay strobili development. In some embodiments, the protective covering comprises a reflective outer surface or layer. In some embodiments, the protective covering comprises or consists of aluminum (e.g., aluminum foil) or an aluminized material. In some embodiments, the protective covering selected to delay strobili development comprises a material that maintains a temperature inside the protective covering that is within 5 to 10 degrees F. of the outside ambient temperature.

In other embodiments of the method, the protective covering is selected to advance the development stage of the covered strobili (flower), and comprises a material that maintains a higher temperature inside the protective covering (such as from 15 to 30 degrees higher) than the outside ambient temperature. In some embodiments, the protective covering selected to advance the developmental stage of the covered strobili comprises or consists of nonwoven fabric, paper, plastic material and may also comprise a non-reflective surface, such as a dark or black non-reflective surface. In some embodiments, the protective covering selected to advance the development stage comprises or consists of a transparent material, such as sausage casing.

The methods of the invention may be used on all types of gymnosperm trees to delay and/or advance the strobili development of the strobilis growing on the trees in order to facilitate a tree breeding program. In some embodiments, the methods of the invention are used to delay and/or advance the strobili development on conifer trees from any conifer species, such as members of the family Pinaceae, including members of the genus *Pinus* (e.g., loblolly pine (*Pinus taeda*)), or such as members of the genus *Pseudotsuga* (e.g., Douglas-fir (*Pseudotsuga menziesii*)), or such as members of the genus *Abies* (e.g., white fir (*Abies concolor*)), or such as members of the genus *Picea* (e.g., black spruce (*Picea mariana*)).

In some embodiments, the protective covering selected to delay the development stage of the covered strobili buds is installed on female strobilis on a conifer tree at a time prior to strobili receptivity (i.e., stage 1-2) and is maintained over the strobili until the majority of uncovered control female strobili are at a developmental stage that is no longer receptive to pollination.

As described herein, in one representative embodiment, the inventors have discovered that aluminum bags similar to hot dog wrapper bags may be used to delay female strobili development by securing the bags (i.e., protective covering) over the developing female strobili bud during the first three weeks of December, such that the bags are sealed to block light. The bags were then removed around the time when non-delayed stroboli on the same trees reached maximum receptivity. Then, for control pollinations to further the breeding programs, the strobili were then isolated in normal pollination bags. Pollen can be collected and processed from branches with pollen strobili and made ready for pollination. When the delayed female strobili become receptive, the pollen can be introduced into the pollination bag. Typically, pollination in bags is carried out by holding the bag in an upright position and dispensing the pollen with an air-delivery system, injecting the pollen into the top of the bag and allowing it to settle onto the strobili. The bag is then removed after the strobili in the bag have reached stage 6 (typically 7 to 10 days after stage 5 begins, so bags are usually removed 2 weeks after pollination). This process allows the breeding of advanced generation selections to be completed in a single year.

For control mass pollination (CMP), the delayed female strobili are allowed to develop naturally. Since the delayed strobili are out of phase with the orchard, they do not need to be bagged with pollination bags because when the delayed strobili reach receptivity, there is no natural pollen flying in the orchard. CMP pollen can be applied by a number of methods. The value in this process comes from greater strobili retention (no flower losses due to pollination bag damage)

and a less expensive method of conducting the pollinations (i.e., avoids the need for individually adding pollen to the pollination bags).

In one embodiment, the method comprises selecting strong strobili-bearing branches in the upper crown in an upright position, installing a protective covering (e.g., a bag) selected to delay female strobili development when the strobili are at stage 1 and optionally supporting the bag with a cane or wire; removing the delay bag when unbagged female strobili reach stage 5; replacing the delay bag with a standard CMP isolation bag; monitoring the bag for strobili receptivity, and applying about 0.5 $cm^3$ of pollen when the majority of the strobili are maximally receptive at stage 5. The bag may then be removed about 2 weeks after pollination, and the strobili mature and produce seed.

In another aspect, a method is provided for synchronizing the timing of pollen collection from male strobili and female strobili receptivity in a gymnosperm tree breeding program, such as a conifer tree breeding program. The methods according to this aspect of the invention comprise (a) advancing the development stage of one or more male strobili on one or more tree(s) in a breeding program comprising installing over one or more male strobili bud(s) a type of protective covering selected to advance male strobili development, and maintaining the protective covering over the strobili until pollen is generated; and/or (b) delaying the development stage of one or more female strobili on one or more tree(s) in the breeding program, comprising installing over one or more female strobili bud(s) a type of protective covering selected to delay female strobili development, and maintaining the protective covering over the female strobili until either sufficient pollen is generated in accordance with step (a), or until the majority of uncovered control female strobili are at a developmental stage that is no longer receptive to pollination.

In one embodiment, the method further comprises applying the pollen generated according to step (a) to the female strobili, treated according to step (b). In one embodiment, the method further comprises applying pollen generated from non-advanced strobili to the female strobili that were treated according to step (b). In one embodiment, the pollen is applied while the female strobili is still covered with the protective covering. In another embodiment, the protective covering is removed prior to pollination, such as a control mass pollination.

The following examples merely illustrate the best mode now contemplated for practicing the invention, but should not be construed to limit the invention.

EXAMPLES

Background/Rationale

Breeding loblolly pine trees quickly after selection for inclusion in an advanced-generation breeding program can be a challenge. TABLE 2 below shows the typical timeline for top-graft breeding. Considerable research has produced techniques to induce flowering because grafts made on one-year-old rootstock in the field do not produce enough flowers for breeding for 5 or more years. For example, when using top grafting to induce flowering, it has been determined that by grafting in the tops of mature orchard trees, strobili production can be advanced and breeding can be completed for a given group of select trees 2 to 3 years after grafting. However, even when male and female strobili are present, it is still difficult to get the pollen processed in time for pollinating the females in the same season before they move out of the receptive stage.

TABLE 2

Previous method for top-graft breeding

| Time | Procedure |
|---|---|
| Year 0 | Top graft new selections in the spring |
| Year 1 | Collect pollen in the spring from those selections producing pollen and store |
| Year 2 | Advance pollen on some late pollen producers by using sausage casing |
| Year 2 | Apply pollen from years 1 and 2 to females produced on year 2 (usually it is not possible to get pollen from all males in time for pollinations) |
| Year 3 | Collect cones in the fall, process seed |
| Year 4 | Plant progeny tests in the field |
| Year 10 | Make new selections and start the cycle over again |

If a method can be found that delays female strobili development significantly while pollen shed is advanced, such as through the use of sausage casing, it may be possible to complete the breeding in Year 1 after grafting if enough female strobili and pollen are produced. This would reduce the generation time from 10 to 9 years.

To complete the breeding in Year 1, it may be necessary to make more grafts of each selection in order to have enough strobili to complete the mating design. At Year 2, there are more strobili per graft due to their larger size. Getting genetic gains from breeding in the field one year early would have a very large economic return for the tree improvement program, so it would pay to spend more, if necessary, to complete the breeding in Year 1. At the very least, such a method would make it easier to obtain pollen from most or all males in time for breeding in the 2nd year. The objective of breeding is to have pollen in hand for pollination of females at peak receptivity, or late stage 4 through early stage 5. Strobili are not generally receptive at stage 3 before the scales are open or at stage 6 after the scales are swollen and pollen cannot enter the pollen chamber where fertilization of the ovule occurs.

In the Examples described herein, a series of sequential studies were conducted to (1) determine if bag material (i.e., protective covering) could be used to delay female strobili development long enough to allow for pollen processing and subsequent pollination; (2) to determine the optimum time to install bags for maximum female strobili delay; and (3) to determine the development of female strobili and subsequent seed formation after pollinating the delayed female flowers.

In the studies described herein, female strobili were scored for developmental stage according to the criteria described in Bramlett and O'Gwynn, "Recognizing Developmental Stages in Southern Pine Flowers: the Key to Controlled Pollination," Gen Tech Rep SE-18. Asheville, N.C.: USDA Forest Service, Southeastern For Exp Station. 14p (1980), as illustrated in FIGS. 1A-G.

Example 1

This Example describes a study carried out in 2006 (study #1) to test seven isolation (i.e. protective) bag types of different size, color and construction material to determine if there was any difference in their effectiveness in delaying female strobili development in loblolly pine.

Methods and Materials (Study #1 (2006))

Two breeding bags per each of seven bag types were installed on each of two parent loblolly pine trees: parent A: (medium development) and parent B (late development) in a seed orchard in early February 2006. In this study, "Mid-late" parents were chosen because of a delay in obtaining some of the bag materials needed to start the study. The total number of bags installed were 2 parents×7 bag types×2 bags per tree=28 bags. The seven bag types and control treatments are described below in TABLE 3.

TABLE 3

Isolation Bag Materials used in Study #1 (2006)

| Treatment | Bag Material | Description |
|---|---|---|
| A | Small Kraft Paper | Suitable for outdoor breeding (CMP bag), (source: Lawson company) |
| B | Medium Kraft Paper | Suitable for outdoor breeding (CMP bag), (source: Lawson company) |
| C | White Nonwoven Fabric (with transparent window) | Suitable for outdoor breeding, used for pedigree breeding for excellent pollen exclusion and flower protection (source: Tyvek company) |
| D | White Nonwoven Fabric painted black | Same material as Treatment C, painted black to increase internal temperature |
| E | Sausage casing | Transparent material for outdoor breeding that produces a greenhouse effect |
| F | aluminum foil | Blocks solar radiation and reduces internal temperature |
| G | aluminum foil wrapped around white nonwoven fabric | Outer layer blocks solar radiation and reduces internal temperature |
| H | Control | Branches that were tagged but left unbagged |

FIG. 2 is a photograph showing the various bag types used in Study #1. As shown in FIG. 2, the bags were each tied at the bottom with a nylon cable tie that was used to cinch the bags to the branch. However, any type of fastener, such as rope, wire, etc, that is suitable for tightly cinching the bottom of the bag to exclude sunlight.

The different treatments using the isolation bag types described in Table 3 were chosen to provide a good range of temperatures within the bag and to provide different levels of solar radiation (sunlight) inside the bag. It is thought that both temperature and solar radiation can impact strobili development. However, neither temperature nor solar radiation inside and outside the bags was measured in this pilot study.

Isolation bags were installed on both orchard parents (A and B) on Feb. 3, 2006 and were removed from parent A on Mar. 8, 2006 and from parent B on Mar. 15, 2006. At the time of bag installation, all female strobili were at stage 1 or 2 (i.e., closed buds with no flower exposure, as described in TABLE 1 and illustrated in FIGS. 1A and 1B). The isolation bags were removed and development of the flowers that were inside the bags was scored when the flowers (as viewed through the transparent window) in the nonwoven white bag were at peak receptivity (i.e., Stage 5, as described in TABLE 1 and shown in FIG. 1F).

Upon bag removal, all female strobili were scored for developmental stage, according to the criteria shown in TABLE 1 and illustrated in FIGS. 1A-G, as described in Bramlett and O'Gwynn, "Recognizing Developmental Stages in Southern Pine Flowers: the Key to Controlled Pollination," Gen Tech Rep SE-18. Asheville, N.C.: USDA Forest Service, Southeastern For Exp Station. 14p (1980).

Results:

By bag removal time, all bag types had advanced female strobili stage development as compared to the unbagged control, with the exception of the aluminum foil bags that actually delayed development, as shown in TABLES 4A-C for parents A and B, and summarized in TABLE 5. The counts shown in TABLES 4A-C are for 2 bags per bag type per parent.

TABLE 4A

Strobili per bag scored for female strobili stage for the 7 bag types and an unbagged control from parent tree B

| Treatment | Total Flower Count | Stage 2 Flower count/% total | | Stage 3 Flower count/% total | | Stage 4 Flower count/% total | | Stage 4 late Flower count/% total | | Stage 5 Flower count/% total | | Stage 5 late Flower count/% total | | Stage 6 lower count/% total | |
|---|---|---|---|---|---|---|---|---|---|---|---|---|---|---|---|
| unbagged control H | 45 | 12 | 26.7% | 33 | 73.3% | — | — | — | — | — | — | — | — | — | — |
| A | 25 | — | — | — | — | 8 | 32.0% | 13 | 52.0% | 4 | 16.0% | — | — | — | — |
| B | 38 | — | — | 4 | 10.5% | 25 | 65.8% | 9 | 23.7% | — | — | — | — | — | — |
| C | 54 | — | — | — | — | 1 | 1.9% | 18 | 33.3% | 23 | 42.6% | 12 | 22.2% | — | — |
| D | 29 | — | — | — | — | — | — | 9 | 31.0% | 5 | 17.2% | 11 | 37.9% | 4 | 13.8% |
| E | 29 | — | — | — | — | — | — | 3 | 10.3% | 5 | 17.2% | 5 | 17.2% | 16 | 55.2% |
| F | 35 | 35 | 100% | — | — | — | — | — | — | — | — | — | — | — | — |
| G | 37 | 37 | 100% | — | — | — | — | — | — | — | — | — | — | — | — |

Note:
bags were installed Feb. 3, 2006 and removed Mar. 15, 2006; flower stage was measured on Mar. 15, 2006.

TABLE 4B

Strobili per bag scored for female strobili stage for the 7 bag types and an unbagged control from parent tree A

| Treatment | Total Flower Count | Stage 2 Flower count/ % total | | Stage 3 Flower count/ % total | | Stage 4 Flower count/ % total | | Stage 4 late Flower count/ % total | | Stage 5 Flower count/ % total | | Stage 5 late lower count/ % total | | Stage 6 Flower count/ % total | |
|---|---|---|---|---|---|---|---|---|---|---|---|---|---|---|---|
| unbagged control H | 45 | 7 | 15.6% | 35 | 77.8% | 3 | 6.7% | — | — | — | — | — | — | — | — |
| A | 20 | — | — | — | — | 14 | 70.0% | 6 | 30% | — | — | — | — | — | — |
| B | 37 | — | — | 4 | 10.8% | 12 | 32.4% | 12 | 32.4% | 6 | 16.2% | 3 | 8.1% | — | — |
| C | 30 | — | — | — | — | 6 | 20% | 9 | 30% | 15 | 50% | — | — | — | — |
| D | 37 | — | — | — | — | — | — | 10 | 27% | 17 | 45.9% | 6 | 16.2% | 4 | 10.8% |
| E | 40 | — | — | — | — | — | — | — | — | 4 | 10% | 18 | 45% | 18 | 45% |
| F | 20 | 4 | 20% | 16 | 80% | — | — | — | — | — | — | — | — | — | — |
| G | 27 | 4 | 14.8% | 23 | 85.2% | — | — | — | — | — | — | — | — | — | — |

Note:
bags were installed Feb. 3, 2006 and removed Mar. 8, 2006; flower stage was measured on Mar. 8, 2006.

TABLE 4C

Strobili per bag scored for female strobili stage for the 7 bag types and an unbagged control from both parents A and B

| Treatment | Total Flower Count | Stage 2 Flower count/ % total | | Stage 3 Flower count/ % total | | Stage 4 lower count/ % total | | Stage 4 late Flower count/ % total | | Stage 5 Flower count/ % total | | Stage 5 late Flower count/ % total | | Stage 6 Flower count/ % total | |
|---|---|---|---|---|---|---|---|---|---|---|---|---|---|---|---|
| unbagged control H | 90 | 19 | 21.2% | 68 | 75.6% | 3 | 3.3% | — | — | — | — | — | — | — | — |
| A | 45 | — | — | — | — | 22 | 48.9% | 19 | 42.2% | 4 | 8.9% | — | — | — | — |
| B | 75 | — | — | 8 | 10.7% | 37 | 49.3% | 21 | 28% | 6 | 8% | 3 | 4% | — | — |
| C | 84 | — | — | — | — | 7 | 8.3% | 27 | 32.1% | 38 | 45.2% | 12 | 14.3% | — | — |
| D | 66 | — | — | — | — | — | — | 19 | 28.8% | 22 | 33.3% | 17 | 25.8% | 8 | 12.1% |
| E | 69 | — | — | — | — | — | — | 3 | 4.3% | 9 | 13% | 23 | 33.3% | 34 | 49.3% |
| F | 55 | 39 | 70.9% | 16 | 29.1% | — | — | — | — | — | — | — | — | — | — |
| G | 64 | 41 | 64.1% | 23 | 35.9% | — | — | — | — | — | — | — | — | — | — |

TABLE 5

Female strobili stages for 7 different bag types as compared to an unbagged control. Results are averages of bags per type in Study #1 (2006) (2 for each of 2 orchard parent trees)

| | Stage 1 | Stage 2 | Stage 3 | Stage 4 | Stage 4 late | Stage 5 | Stage 5 late | Stage 6 |
|---|---|---|---|---|---|---|---|---|
| no bag control | 0% | 22% | 75% | 3% | 0% | 0% | 0% | 0% |
| A (small brown kraft paper) | 0% | 0% | 0% | 48% | 44% | 8% | 0% | 0% |
| B (medium brown kraft paper) | 0% | 0% | 11% | 49% | 29% | 7% | 4% | 0% |
| C (white non-woven fabric) | 0% | 0% | 0% | 8% | 33% | 45% | 14% | 0% |
| D (white non-woven fabric painted black) | 0% | 0% | 0% | 0% | 29% | 33% | 26% | 12% |
| E (sausage casing-clear) | 0% | 0% | 0% | 0% | 4% | 14% | 33% | 49% |
| F (aluminum foil only) | 0% | 64% | 36% | 0% | 0% | 0% | 0% | 0% |
| G (aluminum foil wrapped around white nonwoven fabric) | 0% | 71% | 29% | 0% | 0% | 0% | 0% | 0% |

Discussion of Results:

By bag removal time, all bag types had advanced female stage development as compared to the unbagged control, with the exception of the two types of aluminum foil bags (treatment F and G) that actually delayed development (see TABLES 4 and 5).

After delay bags were removed, all female strobili looked healthy and developed continued normally after bag removal.

The sausage casing bag type advanced strobili development stages faster than the other bag types, followed closely by the nonwoven fabric that was painted black. All bag types except the ones with aluminum had advanced flowers to receptivity or beyond (i.e., stages 4 through 6), while the control and aluminum bags had not yet reached receptivity (i.e., stages 2 and 3) with approximately 70% of the flowers in the aluminum bags were still at stage 2.

As shown in TABLES 4 and 5, the brown kraft paper bags used for controlled mass pollination (CMP) advanced female strobili stage development. This phenomenon plus the fact that it is cooler inside the kraft paper bags at night (data not shown), puts the flowers at an increased risk of late frosts. It has been previously determined that flowers inside the brown kraft paper bags have considerably high mortality than flowers outside the bags (data not shown).

The white nonwoven fabric bag with aluminum on the outside (treatment G) delayed flower development as well as aluminum bag alone (F). These results have implications for breeding work in that treatment F (aluminum foil bag) or G (double bag) could be used to delay female strobili development until such time as pollen is in hand. For example, with a double bag (treatment G), the outer aluminum layer could be removed so that breeding could go forward. Alternatively, if desired, painting the bag black could hasten the breeding work since the black bag advances flowers faster than the white bag. Double bagging in the beginning would be easier than changing from aluminum to the nonwoven fabric in the middle of the breeding season.

The results from this study show that bag material and color can be used to modulate (i.e., speed or slow) female strobili development to make intra-season breeding more manageable. For example, modulating female strobili development in order to delay or advance certain orchard parents and thereby distribute the work load, would make breeding more manageable; especially during years of compressed flower development due to unusual weather conditions. Aluminum bags essentially held the strobili in the stage they were bagged in for over a month. All bags except the ones with aluminum (e.g., sausage casing, nonwoven fabric, kraft paper) had advanced flowers to receptivity or beyond while the unbagged control and aluminum bags had not yet reached receptivity, and can be used to hasten pollen processing. In view of these results, breeding could be completed in one season after grafting, assuming there are enough female and male flowers. In the past, we have had to rely on collecting pollen the first year for pollinating females in the second year.

Example 2

This Example describes a follow on study #2 (2007) that was carried out to test additional isolation (i.e. protective) bag types, which were all derivations of the aluminum bag, in order to determine their effectiveness in delaying female flower development.

Rationale:

This follow up study #2 (2007) to the study described in Example 1 was carried out to (1) test other bag types, some with insulation; (2) add an "early" phenotype parent C to the "medium" parent A and "late" parent B phenotype parents in order to have a full range of phenotypes; and (3) to measure temperatures differences inside the bags versus outside the bags.

Methods:

Two breeding bags per each of 7 bag types were installed on each of the three parent trees (A,B,C) in early February 2006. The total number of bags installed were: (3 parents×bag types×2 bags per tree)=42 bags. The seven bag types used in this study are described below in TABLE 6 and shown in the photograph provided as FIG. 2.

TABLE 6

Materials Used in Study #2 (2007)

| Treatment | Bag Material | Description |
|---|---|---|
| I | Medium Brown Kraft Paper | Suitable for outdoor breeding (CMP bag) (source: Lawson company) |
| J | Medium Kraft paper painted aluminum color | Kraft brown bag painted silver on the outside to reduce internal temperature. |
| K | White NonwovenFabric (with transparent window) | Suitable for outdoor breeding, used for pedigree breeding for excellent pollen exclusion and flower protection (Tyvek company) |
| L | aluminum foil only | Blocks solar radiation and reduces internal temperature |
| M | aluminum "hot bag ®" | Rough textured exterior designed for home cooking on a grill (Reynolds Corporation) |
| N | aluminum foil with styrofoam insulation on the outside | Blocks solar radiation and conserves internal temperature |
| O | aluminum foil over polyester insulation on the inside | Blocks solar radiation and conserves internal temperature |
| P | No bag control | Branches that were tagged but left unbagged |

Figure 1F:
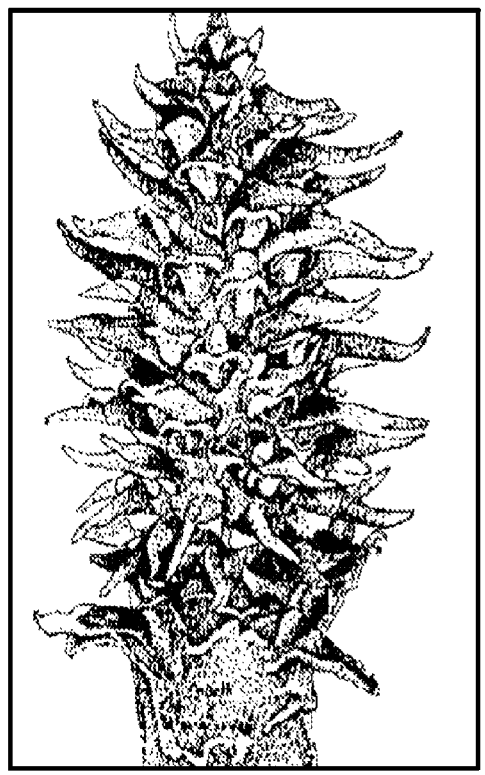
Figure 1G:
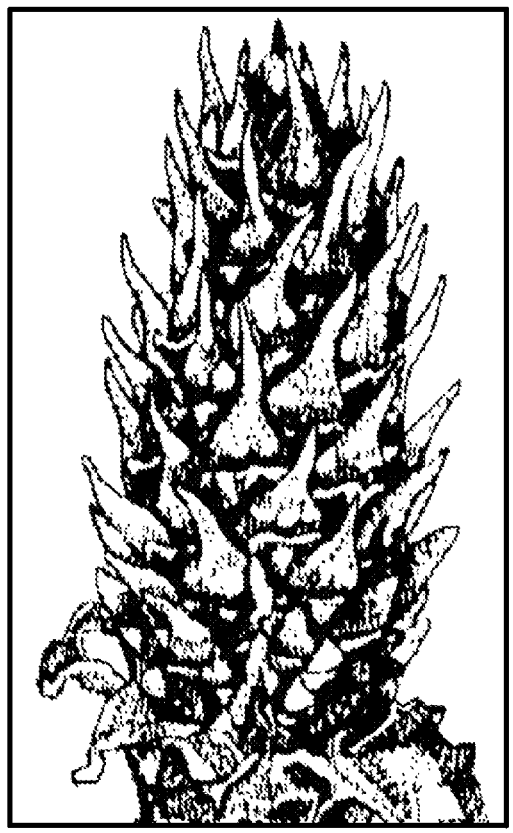

The bags described in Table 6 were installed on the three parent trees (A,B,C) on 2/01 and 2/07 and were removed from parent C on Mar. 9, 2007, from parent A on Mar. 12, 2007, and from parent B on Mar. 23, 2007. At the time of installation, all female strobili were at stage 2 (i.e., buds closed with no strobili exposure, as described in TABLE 1 and illustrated in FIG. 1B). Bags were removed and scored when the strobili in the nonwoven white bag, as viewed through the transparent window, were at peak receptivity (i.e., at Stage 5, as shown in FIG. 1F). Upon bag removal, all female strobili were scored for development stage according to the stages shown in FIGS. 1A-G (Bramlett and O'Gwynn 1980).

Temperature recorders (iButtons® by Dallas Semiconductor) were installed inside all bag types and outside the bags and remained on the trees for the duration of the experiment. Afterward, diurnal temperature profiles were plotted from Feb. 3 through Mar. 20, 2007.

Results:

TABLE 7A

Parent tree C, Tree 18-6, bags installed Feb. 1, 2007 and removed Mar. 9, 2007

| Treatment | Total Flower Count | Stage 2 Flower count/% total | | Stage 3 Flower count/% total | | Stage 4 Flower count/% total | | Stage 4 late Flower count/% total | | Stage 5 Flower count/% total | | Stage 5 late Flower count/% total | | Stage 6 Flower count/% total | |
|---|---|---|---|---|---|---|---|---|---|---|---|---|---|---|---|
| unbagged control P | 28 | — | — | 2 | 7.1% | 12 | 42.9% | 6 | 21.4% | 8 | 28.6% | — | — | — | — |
| I | 27 | — | — | — | — | 2 | 7.4% | 7 | 25.9% | 12 | 44.4% | 6 | 22.2% | — | — |
| J | 26 | — | — | 3 | 11.5% | 5 | 19.2% | 10 | 38.5% | 8 | 30.8% | — | — | — | — |
| K | 32 | — | — | — | — | — | — | — | — | 10 | 31.3% | 13 | 40.6% | 9 | 28.1% |
| L | 33 | 25 | 75.8% | 2 | 6.1% | 2 | 6.1% | 2 | 6.1% | 2 | 6.1% | — | — | — | — |
| M | 25 | 8 | 32.0% | 9 | 36.0% | 4 | 16.0% | 4 | 16.0% | — | — | — | — | — | — |
| N | 29 | 26 | 89.7% | 3 | 10.3% | — | — | — | — | — | — | — | — | — | — |
| O | 26 | 25 | 96.2% | 1 | 3.8% | — | — | — | — | — | — | — | — | — | — |

TABLE 7B

Parent tree A, Tree 37-55, bags installed Feb. 1, 2007 and removed Mar. 12, 2006

| Treatment | Total Flower Count | Stage 2 Flower count/% total | | Stage 3 Flower count/% total | | Stage 4 Flower count/% total | | Stage 4 late Flower ount/% total | | Stage 5 Flower count/% total | | Stage 5 late Flower count/% total | | Stage 6 Flower count/% total | |
|---|---|---|---|---|---|---|---|---|---|---|---|---|---|---|---|
| unbagged control P | 40 | — | — | — | — | — | — | 5 | 12.5% | 35 | 87.5% | — | — | — | — |
| I | 21 | — | — | — | — | — | — | 1 | 4.8% | 17 | 81.0% | 3 | 14.3% | — | — |
| J | 44 | — | — | — | — | — | — | 1 | 2.3% | 43 | 97.7% | — | — | — | — |
| K | 38 | — | — | — | — | — | — | — | — | 31 | 81.6% | 7 | 18.4% | — | — |
| L | 20 | 4 | 20.0% | 10 | 20.0% | 3 | 15.0% | — | — | 3 | 15.0% | — | — | — | — |
| M | 25 | 1 | 4.0% | 14 | 56.0% | 5 | 20.0% | 2 | 8.0% | 3 | 12.0% | — | — | — | — |
| N | 21 | — | — | — | — | — | — | 3 | 14.3% | 18 | 85.7% | — | — | — | — |
| O | 35 | 12 | 34.3% | 16 | 45.7% | 4 | 11.4% | 3 | 8.6% | — | — | — | — | — | — |

TABLE 7C

Parent tree B, tree 34-53, bags installed Feb. 2, 2007 and removed Mar. 23, 2006

| Treatment | Total Flower Count | Stage 2 Flower count/% total | | Stage 3 Flower count/% total | | Stage 4 Flower count/% total | | Stage 4 late Flower count/% total | | tage 5 Flower count/% total | | Stage 5 late Flower count/% total | | Stage 6 Flower count/% total | |
|---|---|---|---|---|---|---|---|---|---|---|---|---|---|---|---|
| unbagged control P | 38 | — | — | 3 | 7.9% | 26 | 68.4% | 3 | 7.9% | 6 | 15.8% | — | — | — | — |
| I | 50 | — | — | 5 | 10.0% | 3 | 6.0% | — | — | 42 | 84.0% | — | — | — | — |
| J | 33 | 3 | 9.1% | — | — | 12 | 36.4% | 2 | 6.1% | 16 | 48.5% | — | — | — | — |
| K | 32 | — | — | — | — | — | — | — | — | 23 | 71.9% | 9 | 28.1% | — | — |
| L | 28 | 27 | 96.4% | 1 | 3.6% | — | — | — | — | — | — | — | — | — | — |
| M | 31 | 22 | 71.0% | 9 | 29.0% | — | — | — | — | — | — | — | — | — | — |
| N | 26 | 25 | 96.2% | 1 | 3.8% | — | — | — | — | — | — | — | — | — | — |
| O | 38 | 25 | 65.8% | 13 | 34.2% | — | — | — | — | — | — | — | — | — | — |

TABLE 7D

All 3 parents (A, B, C), bags installed Feb. 1, 2007 and stages were scored when flowers in Tyvek ® bag were at maximum receptivity

| Treatment | Total Flower Count | Stage 2 Flower count/ % total | | Stage 3 Flower count/ % total | | Stage 4 Flower count/ % total | | Stage 4 late Flower count/ % total | | Stage 5 Flower count/ % total | | Stage 5 late Flower count/ % total | | Stage 6 Flower count/ % total | |
|---|---|---|---|---|---|---|---|---|---|---|---|---|---|---|---|
| unbagged control P | 106 | — | — | 5 | 4.7% | 38 | 35.8% | 14 | 13.2% | 49 | 46.2% | — | — | — | — |
| I | 98 | — | — | 5 | 5.1% | 5 | 5.1% | 8 | 8.2% | 71 | 72.4% | 9 | 9.2% | — | — |
| J | 103 | 3 | 2.9% | 3 | 2.9% | 17 | 16.5% | 13 | 12.6% | 67 | 65.0% | — | — | — | — |
| K | 102 | — | — | — | — | — | — | — | — | 64 | 62.7% | 29 | 28.4% | 9 | 8.8% |
| L | 81 | 56 | 69.1% | 13 | 16.0% | 5 | 6.2% | 2 | 2.5% | 5 | 6.2% | — | — | — | — |
| M | 81 | 31 | 38.3% | 32 | 39.5% | 9 | 11.1% | 6 | 7.4% | 3 | 3.7% | — | — | — | — |
| N | 76 | 51 | 67.1% | 4 | 5.3% | — | — | 3 | 3.9% | 18 | 23.7% | — | — | — | — |
| O | 99 | 62 | 62.6% | 30 | 30.3% | 4 | 4.0% | 3 | 3.0% | — | — | — | — | — | — |

TABLE 8

Flower Stages for 7 different bag types in 2007 study compared to an unbagged control. Results are averages of 6 bags per type (2 for each of 3 orchard parent trees A, B, C)

| | Stage 1 | Stage 2 | Stage 3 | Stage 4 | Stage 4 late | Stage 5 | Stage 5 late | Stage 6 |
|---|---|---|---|---|---|---|---|---|
| no bag control (P) | 0% | 0% | 5% | 40% | 15% | 40% | 0% | 0% |
| I (medium brown kraft paper) | 0% | 0% | 4% | 4% | 8% | 66% | 18% | 0% |
| J (medium brown kraft paper painted silver) | 0% | 2% | 2% | 18% | 13% | 65% | 0% | 0% |
| K (white non-woven fabric) | 0% | 0% | 0% | 0% | 0% | 40% | 42% | 18% |
| L (aluminum foil only) | 0% | 69% | 17% | 6% | 3% | 5% | 0% | 0% |
| M (aluminum hot bag) | 0% | 38% | 39% | 12% | 8% | 3% | 0% | 0% |
| N (aluminum foil with styrofoam insulation outside) | 0% | 67% | 6% | 0% | 4% | 23% | 0% | 0% |
| O (aluminum foil over polyester insulation inside) | 0% | 63% | 30% | 4% | 3% | 0% | 0% | 0% |

Figure 3:
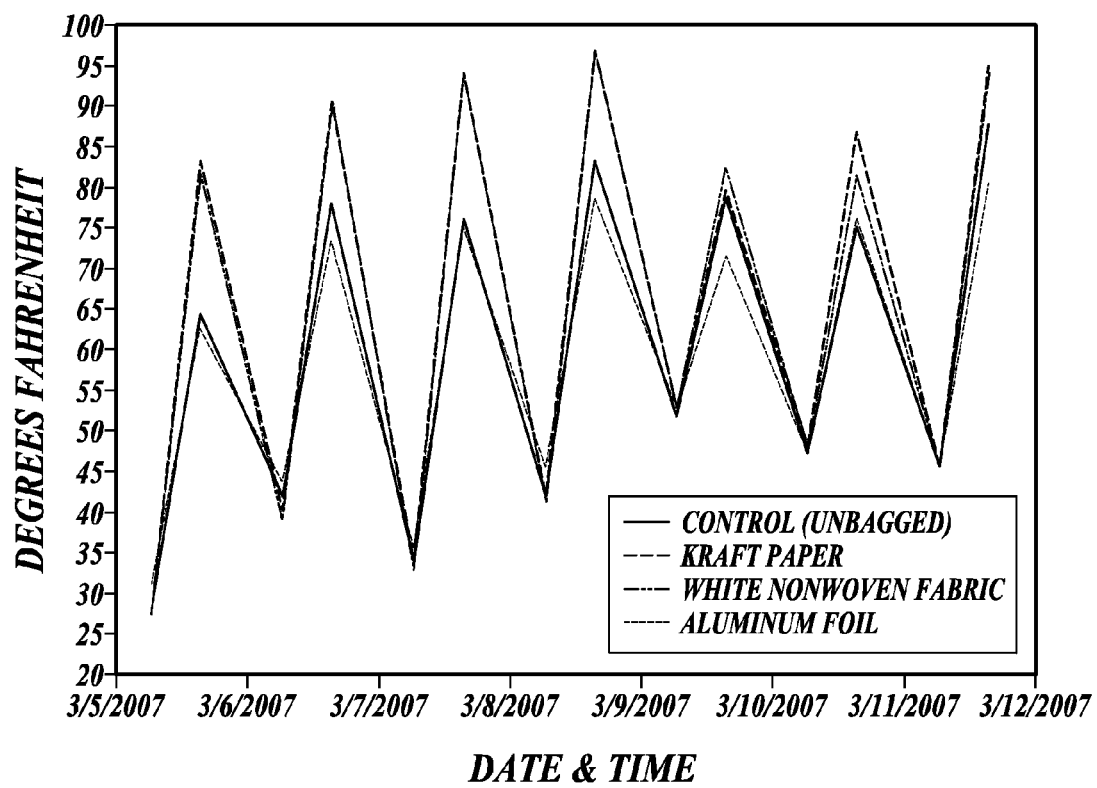
FIG. 3 graphically illustrates the temperatures inside three of the eight different types of isolation bags and the corresponding temperatures outside the bags (control) for a weekly period in March during the 2007 breeding season, as described in Example 2.

FIG. 3 graphically illustrates the temperatures inside the kraft paper bag (treatment I), white nonwoven fabric (treatment K) and aluminum foil (treatment L) bag types and outside the bags (control), recorded daily at 6:30 AM and 3:30 PM for a one week period during the 2007 growing season (Mar. 5, 2007 to Mar. 12, 2007). As shown in FIG. 3, the temperatures inside the aluminum foil bags were not significantly different than the temperature outside the bag (ambient, unbagged temperature), and were within 5 to 10 degrees F. of the control. Most aluminum bags had similar temperature profiles. In contrast, during the day, the temperatures inside the Kraft paper bags (CMP) and white nonwoven bags (breeding) were significantly higher than temperatures outside the bag, and had much higher maximum temperatures. While not wishing to be bound by any particular theory, it appears that the reason why the aluminum foil bagged flowers did not advance in stage as quickly as unbagged flowers is likely related to the absence of light in the aluminum bag, because their temperature profiles were similar to the unbagged controls.

During critical cold periods (below 30 degrees F.) that can kill pine flowers, the aluminum bag may actually afford 2 to 3 degrees of protection as compared to the non-aluminum bags. Maximum temperatures inside the Kraft paper bags and white nonwoven bags was much higher than ambient temperature and that inside the aluminum bags, often as much as 15-30 degrees F. warmer. These results explain why the flowers in these bags advance in stage much faster than the control, since flower phenology is strongly correlated with heat sums.

Conclusions from the 2007 Study (Study #2):

It was determined that isolation bags with aluminum foil (except the "hot bag" from Reynolds Corporation) delayed female strobili development as compared to the other bag types which advanced strobili development compared to the control. It was further observed that strobili development could clearly be advanced (i.e., with sausage casing), or delayed (i.e., with aluminum foil) as compared to natural (unbagged) strobili development.

It was also determined that painting kraft bags silver (treatment J) had little effect on strobili stage development. Insulation, either inside or outside the aluminum, had little effect, with the exception of the exterior Styrofoam (in the case of parent A). In the latter case only, the external insulation advanced rather than delayed strobili development.

Overall Conclusions from Study #1 and #2

It was determined that bag type can be chosen to delay or advance flower stage development in loblolly pine. This finding can be used to facilitate completion of breeding work in the same season by advancing pollen development while delaying female receptivity until pollen is available from the desired male parents, thereby making it possible to process pollen from all males in time for pollination of the females in the same season.

With regard to particular bag types found to be useful for advancing flower development, it was determined that sausage casing, a clear/transparent material that produces a greenhouse effect was most effective at advancing female flower stages. Female flowers under sausage casing were more than 2 stages ahead of the unbagged control. Kraft paper bags used for controlled mass pollination (CMP) and a white nonwoven fabric used for pedigree breeding also advanced flowers ahead of the control. Painting the outer surface of the white bags black further advanced flower development in that bag type.

With regard to particular bag types found to be useful for delaying flower development, it was determined that only the aluminum-type bags delayed female flower development more than the unbagged control. After over a month in the aluminum bag, from early February to mid-March, flowers were found to be essentially at the same stage they were at when they were initially bagged, or only slightly advanced, when bagged at stage 1 or earlier. It was determined that painting the outer surface of brown kraft paper with silver had a small effect on delaying flower development.

In view of these results, the inventors have determined that different bag types can be used to synchronize the timing of pollen collection and female receptivity in order to efficiently complete mating designs in the short breeding window for loblolly pine. For example, males can be advanced for early pollen collection while female flower receptivity can be delayed until pollen is ready. This method would make it possible to complete breeding within only one year after grafting.

Example 3

The Example describes a follow on study #3 (2008) that was carried out to determine the optimum time to install isolation bags to delay flower development.

Rationale:

In the study #1 and study #2, described in Examples 1 and 2, respectively, we noticed that flower development was not delayed completely and flowers on some parents were not delayed as much as other parents. Therefore, this follow on study #3 (2008) was carried out to determine the optimum time to install flower delay treatments to achieve full delay.

Methods:

The four aluminum bag types used in this study were:
(1) thin aluminum foil laminated paper hot dog bag;
(2) heavy aluminum foil laminated paper hot dog bag;
(3) aluminum foil wrap; and
(4) hot dog bag over aluminum foil wrap.

The treatments were applied on January 10 and February 7, and flower development was observed on Mar. 6, 2008. All flowers were at stage 1 at the time of bagging. The parents used in this study were 2 clones that were early to mid-season flowering clones D and E.

Figure 4:
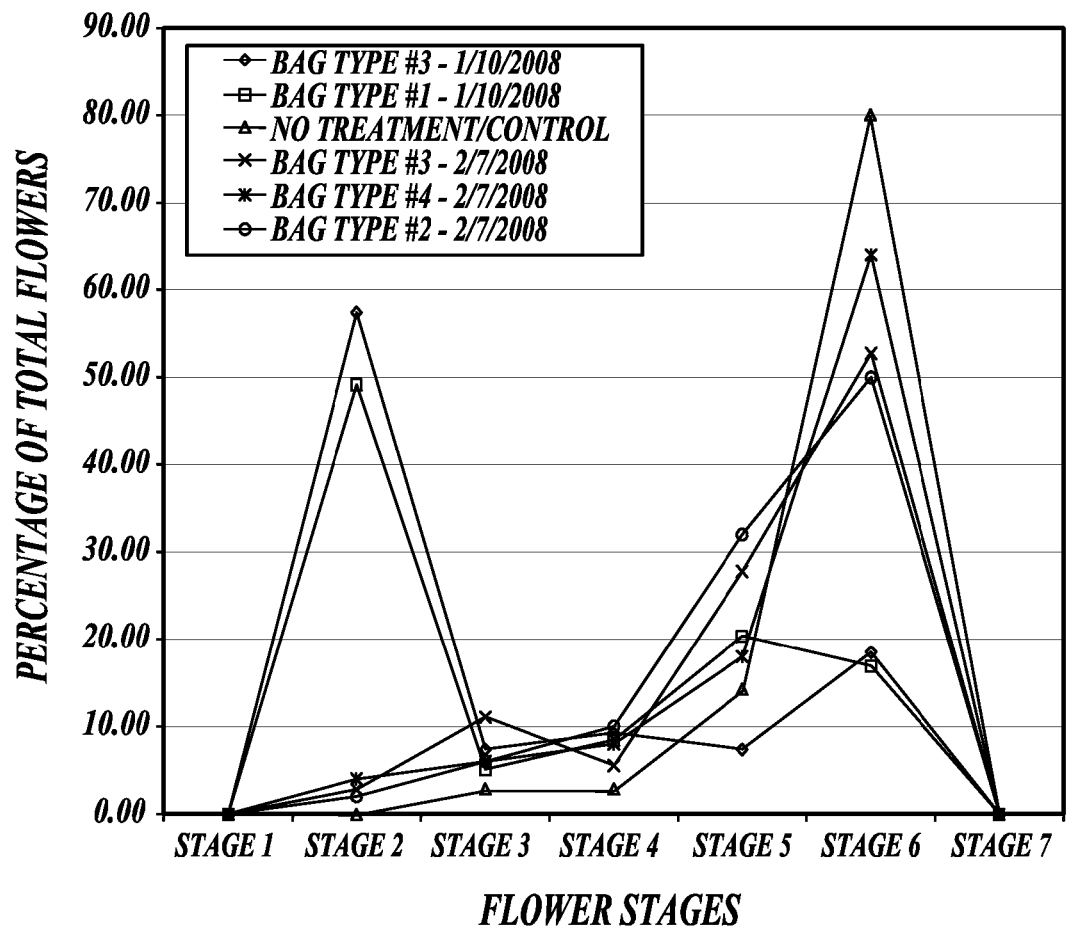
FIG. 4 graphically illustrates the results of a representative flower (stobili) development trial showing the delay in flower (strobili) development observed after using various types of aluminum foil isolation bags, as described in Example 3.

Results:

FIG. 4 graphically illustrates the results of the flower development trial #3 showing the delayed flower development observed after using various types of aluminum foil isolation bags. As shown in FIG. 4, only the treatments applied in January delayed female flower development. The different treatments applied in January worked equally well to delay female flower development.

Therefore, these results demonstrate that the installation date is important to effectively delay female flower development.

Example 4

The Example describes another follow up study #4 (2009) that was carried out to determine the effectiveness (a) timing of application and (2) bags constructed of eight different types of aluminum materials in delaying female flower development.

Rationale:

From the study described in Example 3 (study #3), it was determined that the installation date is an important parameter to effectively delay female flower development. In this follow on study #4, we also wanted to try some different bag material.

Methods:

TABLE 9

Materials used in Study #4 (2009)

| Treatment | Bag type |
|---|---|
| 1 | control: unbagged female flowers |
| 2 | aluminum foil wrap over taped needles |
| 3 | heavy aluminum foil laminated paper hot dog bag over taped needles |
| 4 | bubble foil- 2 layers only |
| 5 | bubble foil - 2 layers with aluminum foil wrap |
| 6 | bubble foil - 1 layer only |
| 7 | bubble foil - 1 layer with ethylene absorbent pack |
| 8 | aluminum foil bag over aluminum foil bag on natural needles |
| 9 | aluminum foil bag over aluminum foil bag on tape wrapped needles |

Study #4:

The eight aluminum bag types described in TABLE 9 were installed during the following three time periods: December 14-15, January 19-22, and Feb. 6-7. In December 14-15, the flower stage was pre-stage 1. The buds were evident but had not yet separated from the main bud as in Stage 1. For the January and February installations, all the flowers were at Stage 1.

The parents used in this study were three early flowering clones (F,G,H); and three normal flowering clones (I,J,K).

Results:

All the treatments worked well (data not shown). The December installation was the only installation date that consistently delayed female flower development across all clones tested.

Example 5

This Example describes another follow up study #5 (2010) that was carried out to determine the effect of light and ventilation on the effectiveness of isolation bags to delay female flower development in loblolly pine.

Rationale:

This follow up study #5 was carried out to (1) determine if light influences the delay of female flower development by using various bag materials to control light entering the isolation bag; (2) to determine if ventilation of the isolation bags has a positive effect on female flower delay treatments by limiting the formation of mold inside the bags during the delay period; (3) to evaluate the effectiveness of seven flower delay treatments in delaying the development of female flowers on mature grafted orchard selections; (4) to determine the effects of isolation bag installation location (North or South)

in the crown on the effectiveness in delaying female flower buds; and (5) to determine if there are differences in the delay of flower bud development in early flowering versus normal flowering parent clones.

Methods:

The materials for the protective coverings used in this study are described below in TABLE 10.

TABLE 10

Materials used in Study #5 (2010)

| Treatment | Bag type |
|---|---|
| 1 | control—unbagged female flowers |
| 2 | bud covering/white latex paint (white paint brushed onto the bud) |
| 3 | thin reinforced aluminum foil with perforations |
| 4 | heavy reinforced aluminum foil with perforations |
| 5 | thin bubble foil - 1 layer |
| 6 | aluminized cloth with perforations - 2 layers |
| 7 | heavy reinforced aluminum foil without perforations |
| 8 | heavy aluminum foil laminated paper hot dog bag, over a heavy aluminum foil laminated paper hot dog bag |

The bags were installed from Dec. 11-16, 2009 and all the flowers were at pre-stage 1 (i.e. the buds were evident but had not yet separated from the main bud as in Stage 1). The parents used in this study were three early flowering clones (L,M,N); and three normal (mid-season) flowering clones (O,P,Q).

Figure 5:
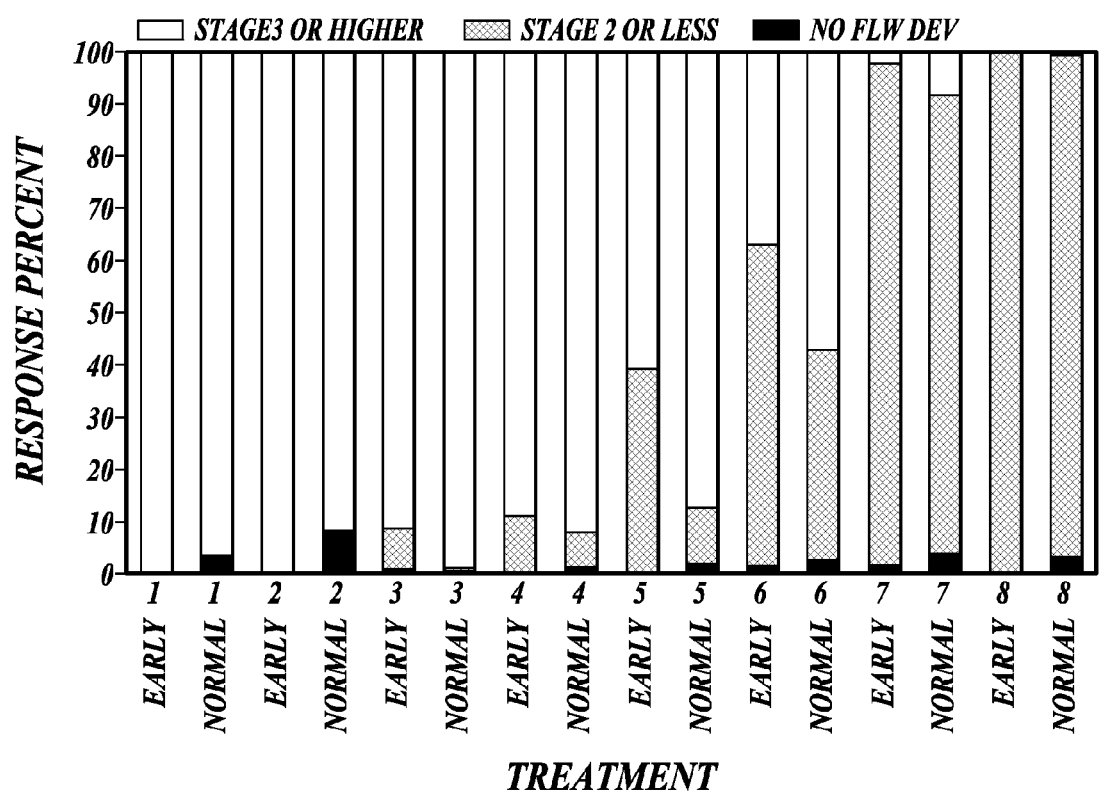
FIG. 5 graphically illustrates the results of a representative flower (strobili) development trial showing the delay in flower (strobili) development observed in response to various treatments as described in Example 5.

Results:

FIG. 5 graphically illustrates the results of flower development trial #5 (2010) showing the response to various treatments described above in TABLE 10.

The results illustrated in FIG. 5 are summarized below in TABLE 11.

TABLE 11

Flower Delay in Response to Treatments (Study #5)

| Treatment | Stage 3 or higher | | Stage 2 or less | | No flower development | |
|---|---|---|---|---|---|---|
| | early clone | normal clone | early clone | normal clone | early clone | normal clone |
| 1 (unbagged control) | 100% | 96.45% | 0% | 0% | 0% | 3.55% |
| 2 (bud covering) | 100% | 91.73% | 0% | 0% | 0% | 8.27% |
| 3 (thin alum foil with holes) | 91.23% | 98.81% | 7.89% | 0.60% | 0.88% | 0.60% |
| 4 (HD alum foil with holes) | 88.89% | 91.98% | 11.11% | 6.79% | 0.00% | 1.23% |
| 5 (thin bubble foil-1 layer) | 60.77% | 87.35% | 39.23% | 10.84% | 0.00% | 1.81% |
| 6 (Alum cloth with holes) | 37.01% | 57.14% | 61.42% | 40.18% | 1.57% | 2.68% |
| 7 (HD alum foil w/o holes) | 2.36% | 8.39% | 96.06% | 87.74% | 1.57% | 3.87% |
| 8 (hot dog bag over hot dog bag) | 0.0% | 0.65% | 100% | 96.10% | 0.00% | 3.25% |

Discussion of Results:

Only the two treatments that were designed to exclude light entirely from the bagged flower buds: heavy duty aluminum foil without holes (treatment #7) and the hot dog bag over hot dog bag (treatment #8) produced adequate levels of flower delay that would be acceptable for use in research breeding programs and CMP programs.

The infiltration of light in the treatments with bags that had holes caused the isolation bag to lose its ability to delay the development of the female flower buds. As shown in FIG. 5 and TABLE 11, direct entry of light through holes or even diffuse light filtered through the bag material itself negated the delay effects of the isolation bag covering the undeveloped flower bud. Even minute amounts of light for an extended period caused the flower buds to develop within the isolation bags. In summary, regardless of isolation bag material that is applied, if the flower buds are allowed to receive any light for an extended period, the buds will be triggered to develop inside the isolation bags.

It is noted that no differences in percentages of flowers delayed across clones and treatments could be attributed to the placement of the delay treatments in the North or South positions in the crown. It is further noted that no differences in percentage of flowers delayed across clones and treatments could be associated with the installation of the delay treatments on early flowering versus normal flowering clones.

In order to determine whether the delay treatments negatively affected flower mortality, conelet development, and seed germination, observations of these characteristics were made on 69 crosses using these flower delaying techniques. The percentage flower mortality, conelet survival, and seed germination were consistent with normal controlled pollinated flower and seeds (data not shown). The seedlings grew well in the nursery without any deformities or malformation, and were planted in field tests.

In conclusion, these results demonstrate that delaying female flower development using aluminum isolation bags does not negatively affect subsequent clonelet and clone development. Seed yields and seed germination were consistent with other controlled pollinated seeds.

Based on the high level of effectiveness in delaying female flowers, durability and low cost, the treatment #8 (hot dog bag over hot dog bag) isolation bag is a preferred method of treatment when female flowers need to be delayed until fresh pollen is collected for research breeding purposes. The same treatment should be equally valuable for use in CMP operations.

For example, the aluminum isolation bags can be applied to branch tips as soon as the female flower buds can be detected. For loblolly pine in the Southern U.S., this is approximately 3 weeks before to 2 weeks after the vernal equinox. The bags must keep the bud and supporting branch tip in total darkness and not allow the temperature inside the bag to be elevated significantly above the temperature outside the bag. Bags can be removed after unbagged flowers become receptive or when pollen has been collected.

While illustrative embodiments have been illustrated and described, it will be appreciated that various changes can be made therein without departing from the spirit and scope of the invention.

The invention claimed is:

1. A method comprising:
   selecting one or more isolation coverings to modulate a development stage by delaying or advancing the development stage of one or more strobili buds growing on a gymnosperm tree;
   installing the one or more isolation coverings over one or more strobili buds while leaving other parts of the gymnosperm tree uncovered and naturally growing; and
   maintaining the one or more isolation coverings over the one or more strobili buds for a time period sufficient to obtain a desired development stage of the one or more strobili buds.

2. The method of claim 1, wherein installing comprises installing the one or more isolation coverings over one or more female strobili bud(s).

3. The method of claim 1, wherein installing comprises installing the one or more isolation coverings over one or more male strobili bud(s).

4. The method of claim 1, wherein the one or more isolation coverings selected to modulate the development stage of the one or more strobili buds comprises a material that completely blocks solar radiation.

5. The method of claim 4, wherein the one or more isolation coverings comprises a reflective outer surface or layer.

6. The method of claim 5, wherein the one or more isolation coverings comprises or consists of aluminum or an aluminized material.

7. The method of claim 4, wherein the one or more isolation coverings comprise a material that maintains a temperature inside the one or more isolation coverings within 5 to 10 degrees F. of ambient temperature.

8. The method of claim 1, wherein the one or more isolation coverings are in a form of a bag.

9. The method of claim 1, wherein the gymnosperm tree is a conifer tree.

10. The method of claim 9, wherein the one or more isolation coverings are installed over the one or more strobili buds prior to, or during, a time period when the one or more strobili buds are at development stages pre-stage 1 to stage 2.

11. The method of claim 10, wherein the maintaining comprises maintaining the isolation coverings over female strobili bud(s) until a majority of uncovered control female strobili are at a developmental stage that is no longer receptive to pollination.

12. The method of claim 1, wherein the one or more isolation coverings are selected to advance the development stage of the one or more strobili buds and comprises a material that maintains a higher temperature inside the one or more isolation coverings than an outside ambient temperature.

13. The method of claim 12, wherein the one or more isolation coverings comprise or consist of a material selected from the group consisting of nonwoven fabric; paper; transparent material; or black painted bags.

14. The method of claim 12, wherein the one or more isolation coverings comprise a non-reflective outer surface.

15. The method of claim 12, comprising installing the one or more isolation coverings over one or more male strobili buds, wherein the maintaining comprises maintaining the isolation coverings over the one or more male strobili buds until the one or more strobili buds develop into one or more strobili that generate pollen.

16. A method of synchronizing the timing of pollen collection from male flowers and female flower receptivity in a gymnosperm tree breeding program comprising: at least one of:
  (a) advancing a development stage of one or more male strobili on one or more tree(s) in a breeding program comprising installing over one or more male strobili bud(s) a type of protective covering selected to advance male strobili development, and maintaining the protective covering over the strobili until pollen is generated; or
  (b) delaying the development stage of one or more female strobili on one or more tree(s) in the breeding program, comprising installing over one or more female strobili bud(s) a type of protective covering selected to delay female strobili development, and maintaining the protective covering over the female strobili until either sufficient pollen is generated in accordance with step (a), or until a majority of uncovered control female flowers are at a developmental stage that is no longer receptive to pollination.

17. The method of claim 16, further comprising at least one of:
  (i) applying the pollen generated according to step (a) to the female flowers; or
  (ii) applying pollen generated from non-advanced strobili.

18. The method of claim 17, wherein the pollen is applied while the female strobili is covered with the protective covering.

19. The method of claim 16, wherein the trees are conifer trees.

20. The method of claim 16, wherein the protective covering is in a form of a bag.

* * * * *